United States Patent
Kerfoot

(10) Patent No.: US 7,666,313 B2
(45) Date of Patent: *Feb. 23, 2010

(54) GROUNDWATER AND SUBSURFACE REMEDIATION

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,892

(22) Filed: Apr. 24, 2006

(65) Prior Publication Data

US 2006/0186060 A1 Aug. 24, 2006

Related U.S. Application Data

(60) Continuation of application No. 10/602,256, filed on Jun. 23, 2003, now Pat. No. 7,033,492, which is a division of application No. 09/610,830, filed on Jul. 6, 2000, now Pat. No. 6,582,611.

(51) Int. Cl.
C02F 1/78 (2006.01)
(52) U.S. Cl. .................. 210/747; 210/759; 210/760; 405/128.5
(58) Field of Classification Search .................. 210/170, 210/198.1, 192, 747, 759, 760, 763, 908, 210/909; 588/316, 405, 406; 166/305.1, 166/310; 405/128.5, 128.75; 261/122.1
See application file for complete search history.

(56) References Cited

U.S. PATENT DOCUMENTS

| | | | |
|---|---|---|---|
| 1,920,719 A | 8/1933 | Stich | |
| 2,517,525 A | 8/1950 | Cummings | |
| 2,845,185 A | 7/1958 | Winderweedle, Jr. | |
| 2,946,446 A | 7/1960 | Herbert | |
| 3,027,009 A | 3/1962 | Price | |
| 3,206,178 A | 9/1965 | Lamb | |
| 3,219,520 A | 11/1965 | Box | |
| 3,276,994 A | 10/1966 | Andrews | |
| 3,441,216 A | 4/1969 | Good | |
| 3,570,218 A | 3/1971 | Finney | |
| 3,669,276 A | 6/1972 | Woods | |
| 3,708,206 A | 1/1973 | Hard et al. | |
| 3,814,394 A | 6/1974 | Murray | |

(Continued)

FOREIGN PATENT DOCUMENTS

DE 3805200 9/1998

(Continued)

OTHER PUBLICATIONS

"Biologically Resistant Contaminants, Primary Treatment with Ozone", D.F. Echegaray et al., Water Science and Technology, A Journal of the International Association on Water Quality, vol. 29, No. 8, 1994, pp. 257-261.

(Continued)

Primary Examiner—Matthew O Savage
(74) Attorney, Agent, or Firm—Lathrop & Gage LLP

(57) ABSTRACT

A method of treating a site containing contaminants and apparatus are described The method and apparatus sparges the site with an air/ozone gas stream delivered with a hydroperoxide, which is a substantial byproduct of a reaction of a contaminant present in the aquifer or soil formation with the ozone.

17 Claims, 5 Drawing Sheets

U.S. PATENT DOCUMENTS

| | | |
|---|---|---|
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Shultz |
| 4,696,739 A | 9/1987 | Pedneault |
| 4,730,672 A | 3/1988 | Payne |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang et al. |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A | 1/1993 | Graves et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,362,400 A | 11/1994 | Martinell |
| 5,364,537 A | 11/1994 | Paillard |
| 5,375,539 A | 12/1994 | Rippberger |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,733 A | 9/1997 | Waldron, Sr., |
| 5,676,823 A | 10/1997 | McKay et al. |
| 5,698,092 A | 12/1997 | Chen |
| 5,741,427 A | 4/1998 | Greenberg et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Dick et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,210,955 B1 | 4/2001 | Hayes |
| 6,214,240 B1 | 4/2001 | Yasunaga et al. |
| 6,217,767 B1 | 4/2001 | Clark |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 * | 3/2002 | Briggs et al. ............ 405/128.25 |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 * | 6/2003 | Kerfoot ...................... 210/747 |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |
| 6,913,251 B2 | 7/2005 | Kerfoot |
| 6,921,477 B2 | 7/2005 | Wilhelm |

| | | | |
|---|---|---|---|
| 6,984,329 | B2 | 1/2006 | Kerfoot |
| 7,022,241 | B2 | 4/2006 | Kerfoot |
| 7,033,492 | B2 | 4/2006 | Kerfoot |
| 7,131,638 | B2 | 11/2006 | Kerfoot |
| 7,156,984 | B2 | 1/2007 | Kerfoot |
| 7,208,090 | B2 | 4/2007 | Applegate et al. |
| 7,264,747 | B2 | 9/2007 | Kerfoot |
| 7,300,039 | B2 | 11/2007 | Kerfoot |
| 7,401,767 | B2 | 7/2008 | Kerfoot |
| 7,442,313 | B2 | 10/2008 | Kerfoot |
| 7,537,706 | B2 | 5/2009 | Kerfoot |
| 7,547,338 | B2 | 6/2009 | Kim et al. |
| 2002/0029493 | A1 | 3/2002 | Baek |
| 2002/0109247 | A1 | 8/2002 | Jager et al. |
| 2003/0029792 | A1 | 2/2003 | Kerfoot |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | |
|---|---|---|
| EP | 0402158 | 12/1990 |
| EP | 0546335 | 6/1993 |
| GB | 2005655 A | 4/1979 |
| GB | 2185901 A | 8/1987 |
| JP | 1-304838 | 12/1989 |
| JP | 3267196 | 11/1991 |
| JP | 4-171036 | 6/1992 |
| JP | 6-023378 | 2/1994 |
| JP | 40931834 | 12/1997 |
| WO | WO 98/21152 | 5/1998 |
| WO | WO 99/54258 | 10/1999 |
| WO | WO2005063367 | 7/2005 |

OTHER PUBLICATIONS

"Analysis of Selected Enhancements for Soil Vapor Extraction", U.S. Environmental Protection Agency, Sep. 1997, pp. 1-5 to 7-39. (Whole Document enclosed).

ThinkVillage-Kerfoot LLC v. Groundwater & Environmental Services, Inc., Answer and Counterclaims, Civil Action No. 1:08-cv-11711-GAO, Dec. 5, 2008, 7 pages.

ThinkVillage-Kerfoot LLC v. Groundwater & Environmental Services, Inc., Amended Answer and Counterclaims, Civil Action No. 1:08-cv-11711-GAO, Dec. 15, 2008, 7 pages.

ThinkVillage-Kerfoot LLC v. Groundwater & Environmental Services, Inc., Plaintiff's Response to Defendant Groundwater & Environmental Services, Inc.'s Amended Counterclaims, Civil Action No. 1:08-cv-11711-GAO, Dec. 30, 2008, 5 pages.

U.S. Appl. No. 10/745,939, selected pages from Image File Wrapper dated Jun. 22, 2006 through Jul. 2, 2008, 113 pages.

U.S. Appl. No. 09/470,167 (US. Pat. No. 6,436,285) Selected pages from File History dated Mar. 29, 2001 through Aug. 23, 2002, 38 pages.

U.S. Appl. No. 10/223,166 (US Pat. No. 6,596,161) Selected pages from File History dated Nov. 6, 2002 through Jul. 22, 2003, 22 pages.

U.S. Appl. No. 10/354,584 Selected pages from Image File Wrapper dated Jul. 30, 2003 through Jul. 6, 2004, 32 pages.

U.S. Appl. No. 10/895,015, selected pages from Image File Wrapper dated Jul. 14, 2006 through Oct. 27, 2008, 102 pages.

U.S. Appl. No. 10/910,441 Selected pages from Image File Wrapper dated Dec. 1, 2004 through Sep. 12, 2005, 36 pages.

U.S. Appl. No. 10/997,452 Selected pages from Image File Wrapper dated Jun. 27, 2007 through Dec. 23, 2008, 129 pages.

U.S. Appl. No. 11/145,871 Selected pages from Image File Wrapper dated Jun. 12, 2007 through Dec. 16, 2008, 93 pages.

U.S. Appl. No. 12/177,467, Restriction Requirement mailed Dec. 29, 2008, 8 pages.

U.S. Appl. No. 11/328,475 Selected pages from Image File Wrapper dated Jun. 30, 2006 through Aug. 15, 2007, 45 pages.

U.S. Appl. No. 11/485,080 Selected pages from Image File Wrapper dated May 11, 2007 through Jan. 9, 2009, 83 pages.

U.S. Appl. No. 11/485,223 Selected pages from Image File Wrapper dated Feb. 26, 2008 through Nov. 12, 2008, 23 pages.

U.S. Appl. No. 11/849,413, selected pages from Image File Wrapper dated Apr. 1, 2008 through Jan. 21, 2009, 45 pages.

U.S. Appl. No. 11/272,446, selected pages from Image File Wrapper dated Oct. 22, 2008 through Jan. 12, 2009, 50 pages.

ThinkVillage-Kerfoot LLC v. Groundwater & Environmental Services, Inc., Complaint for Patent Infringement, US District Court for the District of Massachusettes, Oct. 7, 2008, 5 pages.

U.S. Appl. No. 10/602,256, selected pages from Image File Wrapper through Jan. 11, 2005 through Oct. 11, 2005; 37 pages.

European Application No. 01305133 European Search Report; Jul. 8, 2003; 4 pages.

European Application No. 01305133 Examination Report; Sep. 13, 2005; 4 pages.

European Application No. 01305133 Response to Examination Report; Feb. 28, 2006; 19 pages.

European Application No. 01305133 Examination Report; Oct. 29, 2007; 2 pages.

European Application No. 01305133 Response to Examination Report, Aug. 15, 2008; 13 pages.

Makarov, A.M. & Sorokin, S.S., Heat Exchange Of A Bubble Coated With A Liquid Film On The Rear Surface, Chemical and Petroleum Engineering, vol. 30, No. 2, 1994, pp. 78-81.

"Factors Controlling the Removal of Organic Pollutants in an Ozone Reactor", M.D. Gurol, AWWA 1984 Annual Conference, Dallas, TX, Jun. 10-14, 1984, pp. 2-21.

"In-situ Air Sparging Without Inorganic Nutrient Amendment: An Effective Bioremediation Strategy for Treating Petroleum-Contaminated Groundwater Systems", R. Schaffner, Jr., et al., http://www.bioremediationeroup.org/BioReferences/Tier1Papers/insitu.htm, Jul. 30, 2003, pp. 1-14.

"Environmental Management", DON Environmental Restoration Plan for Fiscal Years 1997-2001, Sep. 30, 1996, pp. 4-1 to 4-8.

"How to Evaluate Alternative Cleanup Technologies for Underground Storage Tank Sites", U.S. Environmental Protection Agency, Oct. 1994.

"Yuma Pilot-Testing Ozone Sparging, Stripping", Pasha Publications, Defense Cleanup, Nov. 8, 1996, pp. 5-6.

"Chemical Degradation of Aldicarb in Water Using Ozone", F.J. Beltran et al., Journal of Chemical Technology & Biotechnology, 1995, pp. 272-278.

"Modelling Industrial Wastewater Ozonation in Bubble Contactors", Ozone Science & Engineering, vol. 17, 1995, pp. 379-398.

"Modelling Industrial Wastewater Ozonation in Bubble Contactors", Ozone Science & Engineering, vol. 17, 1995, pp. 355-378.

"Kinetics of the Bentazone Herbicide Ozonation", Journal of Environmental Science and Health, vol. A31, No. 3, 1996, pp. 519-537.

"Field Applications of In Situ Remediation Technologies: Chemical Oxidation", U.S. Environmental Protection Agency, Sep. 1998, pp. 1-31.

"Technology Status Review In Situ Oxidation", Environmental Security Technology Certification Program, Nov. 1999, pp. 1-42.

Design of a Packed Bed Ozonation Reactor for Removal of Contaminants from Water, Billing, Dissertation Abstracts International, vol. 57, No. 10, Apr. 1997, pp. 6398-B.

"Completed North American Innovative Remediation Technology Demonstration Projects", U.S. Environmental Protection Agency, Office of Solid Waste and Emergency Response, Aug. 12, 1996, pp. 1-35.

"Ground Water Issue", H.H. Russell et al., U.S. Environmental Protection Agency, Jan. 1992, pp. 1-10.

"In Situ Chemical Treatment", Y. Yin, Ph.D., Technology Evaluation Report, GWRTAC, Jul. 1999, pp. 1-74.

"Analysis of Selected Enhancements for Soil Vapor Extraction", U.S. Environmental Protection Agency, Sep. 1997, pp. 1-5 to 7-39.

Biologisch-chemische Behandlung Eines Kontaminierten Grundwassers von einem Gaswerksgelande, Dr.-Ing. Joachim Behrendt, Technische Universitat Hamburg-Harburg, Germany, vol. 136, No. 1, Jan. 1995, pp. 18-24.

"Single-phase Membrane Ozonation of Hazardous Organic Compounds in Aqueous Streams", P.V. Shanbhag et al., Journal of Hazardous Materials 41, 1995, pp. 95-104.

Gas Partitioning of Dissolved Volatile Organic Compounds in the Vadose Zone: Principles, Temperature Effects and Literature Review, J.W. Washington, Groundwater, vol. 34, No. 4, Jul.-Aug. 1996, pp. 709-718.

"Biologically Resistant Contaminants, Primary Treatment with Ozone", D.F. Echegaray et al., *Water Science and Technology, A Journal of the International Association on Water Quality*, vol. 29, No. 8, 1994, pp. 257-261.

"Toxins, toxins everywhere", K.K. Wiegner, *Forbes*, Jul. 22, 1991, pp. 298.

"In Situ Air Sparging System", *Tech Data Sheet, Naval Facilities Engineering Service Center*, Mar. 1997, pp. 1-4.

"Ground Water, Surface Water, and Leachate", http://www.frtr.gov/matrix2/section_4/4-30.html, Jul. 22, 2003, pp. 1-4.

"Alternate Technologies for Wastewater Treatment", J. Hauck et al., *Pollution Engineering*, May 1990, pp. 81-84.

"Cleaning up", *Forbes*, Jun. 1, 1987, pp. 52-53.

"In Situ Chemical Oxidation for Remediation of Contaminated Soil and Ground Water", *EPA*, Sep. 2000, Issue No. 37, pp. 1-6.

"Aquifer Remediation Wells", *EPA*, vol. 16, Sep. 1999, pp. 1-80.

"Transfer Rate of Ozone across the Gas-Water Interface", S. Okouchi et al., The Chemical Society of Japan, No. 2, 1989, pp. 282-287.

"Effect of Organic Substances on Mass Transfer in Bubble Aeration", M. Gurol et al., *Journal WPCF*, vol. 57, No. 3, pp. 235-240, published 1985.

"Clare Water Supply", *EPA*, http://www.epa.gov/region5/superfund/npl/michigan/MID980002273.htm, pp. 1-3.

"Who's Afraid of MTBE?", K.P. Wheeler et al., *Manko, Gold & Katcher*, http://www.rcc-net.com/Wheels.htm, Jul. 2000, pp. 1-5.

"RCC RemedOzone Mobile Remediation System", RCC.

"Santa Barbara I Manufactured Gas Plant Site", *California EPA*, Jan. 2002, pp. 1-6.

"Typical Applications of Ozone", ARCE Systems, Inc., http://www.arcesystems.com/products/ozone/applications.htm, Feb. 2000, pp. 1-2.

"Strategies to Protect Your Water Supply from MTBE", Komex Industries, http://www.komex.com/industries/remediation.stm, 2002, pp. 1-8.

"In Situ Remediation with Chemical Oxidizers: Ozone, Peroxide and Permanganate", Environmental Bio-systems, Inc., pp. 1-5.

"Newark Brownfield Site to Increase Student Housing", Environmental Alliance Monitor, http://www.envalliance.com/monitor&pubs/1998fall.htm, 1998, pp. 1-8.

"In Situ Ozonation to Remediate Recalcitrant Organic Contamination", J. Dablow et al., IT Corporation, pp. 1-2.

"Reaction of Ozone with Ethene and Its Methyl- and Chlorine-Substituted Derivatives in Aqueous Solution," P. Dowideit et al., Environmental Science & Technology, vol. 32, No. 8, pp. 1112-1999, (1998).

"The Ultrox System: USEPA Ultrox International Ultraviolet Radiation/Oxidation Technology", Applications Analysis Report, EPA/540/A5-89/012, Sep. 1990.

"Advanced Oxidation Processes for Treating Groundwater Contaminated with TCE and PCE", Aieta et al., 1988, Pilot-Scale Evaluations., Journal of American Water Works Association, JAWWAS, vol. 80, No. 5, pp. 64-72.

"Treatment of VOC-Contaminated Groundwater by Hydrogen Peroxide and Ozone Oxidation", Bellamy, W.D., G.T. Hickman, P.A. Mueller, and N. Ziemba, Res. J. Water Pollution Control Fed. 63, 120., 1991.

Abstract JP 6/238260, Aug. 30, 1994, Karuto.

U.S. Appl. No. 12/177,467 Notice of Allowance dated Sep. 2, 2009, 8 pages.

U.S. Appl. No. 12/259,051 Notice of Allowance dated Aug. 24, 2009, 7 pages.

U.S. Appl. No. 11/485,223 Notice of Allowance dated Sep. 2, 2009, 7 pages.

U.S. Appl. No. 11/145,871, Notice of Allowance dated Sep. 09, 2009, 7 pages.

U.S. Appl. No. 12/272,462 Notice of Allowance dated Sep. 21, 2009, 8 pages.

Biologisch-chemische Behandlung Eines Kontaminierten Grundwassers von einem Gaswerksgelande, Dr.-Ing. Joachim Behrendt, *Technische Universitat Hamburg-Harburg, Germany*, vol. 136, No. 1, Jan. 1995, pp. 18-24.

"Biologically Resistant Contaminants, Primary Treatment with Ozone", D.F. Echegaray et al., Water Science and Technology, A Journal of the International Association on Water Quality, vol. 29, No. 8, 1994, pp. 257-261.

"Analysis of Selected Enhancements for Soil Vapor Extraction", U.S. Environmental Protection Agency, Sep. 1997, pp. 1-5 to 7-39. (Whole Document enclosed).

Civil Action No. 1:08-cv-11711-GAO, Groundwater & Environmental Services, Inc.'s Objections and Responses to Plaintiffs Requests for Production of Documents and Things, Mar. 4, 2009, 54 pages.

Civil Action No. 1:08-cv-11711-GAO, Groundwater & Environmental Services, Inc.'s Objections and Answers to Plaintiffs Interrogatories, Mar. 4, 2009, 10 pages.

Civil Action No. 1:08-cv-11711-GAO, ThinkVillage-Kerfoot, LLC's Responses to Defendant's Interrogatories (Nos. 1-11) Apr. 9, 2009, 12 pages.

Civil Action No. 1:08-cv-11711-GAO, ThinkVillage-Kerfoot, LLC's Objections and Responses to Defendant's First Set of Requests for Production (Nos. 1-98) Apr. 9, 2009, 37 pages.

Civil Action No. 1:08-cv-11711-GAO, ThinkVillage-Kerfoot, LLC's Supplemental Responses to Defendant's Interrogatories (Nos. 7 and 8) Jun. 2, 2009, 9 pages.

Civil Action No. 1:08-cv-11711-GAO, Groundwater & Environmental Services, Inc.'s Supplemental Response to Plaintiff's Interrogatory Three, Jun. 25, 2009, 36 pages.

Civil Action No. 1:08-cv-11711-GAO, Groundwater & Environmental Services, Inc.'s Supplemental Response to Plaintiffs Interrogatories Three and Four, Jul. 6, 2009, 164 pages.

PCT/US04/43634 International Search Report mailed May 18, 2005, 1 page.

PCT/US04143634 International Preliminary Report on Patentability, Jun. 26, 2006, 5 pages.

Abstract JP 6/238260, Aug. 30, 1994, Karuto.

U.S. Appl. No. 09/860,659, Selected pages from Image File Wrapper dated Aug. 13, 2002 through Aug. 23, 2004, 68 pages.

U.S. Appl. No. 09/943,111, Selected pages from Image File Wrapper dated Jan. 30, 2003 through Feb. 19, 2005, 47 pages.

U.S. Appl. No. 09/993,152, Selected pages from Image File Wrapper dated Sep. 4, 2007 through Mar. 10, 2009, 59 pages.

U.S. Appl. No. 10/365,027, Selected pages from Image File Wrapper dated Apr. 16, 2004 through May 2, 2005, 53 pages.

U.S. Appl. No. 10/794,994 Selected pages from Image File Wrapper dated Jul. 6, 2006 through Apr. 18, 2007,48 pages.

U.S. Appl. No. 10/916,863 Selected pages from Image File Wrapper dated Dec. 28, 2006 through Oct. 8, 2008, 39 pages.

U.S. Appl. No. 10/963,361 Selected pages from Image File Wrapper dated Jul. 19, 2005 through Nov. 7, 2007.

U.S. Appl. No. 10/963,353 Selected pages from Image File Wrapper dated Aug. 23, 2005 through Dec. 13, 2006, 46 pages.

U.S. Appl. No. 10/994,960 Selected pages from Image File Wrapper dated Mar. 11, 2005 through Dec. 2, 2005, 36 pages.

U.S. Appl. No. 11/145,871, Office Action mailed Mar. 18, 2009, 16 pages.

U.S. Appl. No. 11/145,871 Response to Office Action filed Jun. 18, 2009, 10 pages.

U.S. Appl. No. 11/146,722 Selected pages from Image File Wrapper dated Jun. 7, 2005 through Sep. 18, 2006, 70 pages.

U.S. Appl. No. 11/272,446 Selected pages from File History dated Jan. 22, 2008 through May 1, 2009, 60 pages.

U.S. Appl. No. 11/485,080, Response to Office Action filed May 8, 2009, 4 pages.

U.S. Appl. No. 11/485,223 Office Action mailed Jun. 15, 2009, 8 pages.

U.S. Appl. No. 11/485,223 Selected pages from Image File Wrapper dated Feb. 26, 2008 through Mar. 11, 2009, 36 pages.

U.S. Appl. No. 11/594,019 Selected pages from Image File Wrapper dated Apr. 25, 2007 through Oct. 29, 2008, 45 pages.

U.S. Appl. No. 11/849,413 Selected pages from Image File Wrapper dated Sep. 4, 2007 through Mar. 10, 2009, 94 pages.

U.S. Appl. No. 12/177,467 Selected pages from Image File Wrapper dated Dec. 29, 2008 through Jun. 12, 2009, 20 pages.
U.S. Appl. No. 12/254,359, Notice of Allowance dated Jul. 6, 2009, 4 pages.
U.S. Appl. No. 12/259,051, Office Action dated Mar. 24, 2009, 6 pages.
U.S. Appl. No. 12/259,051, Response to Office Action filed Jun. 23, 2009, 8 pages.
U.S. Appl. No. 12/272,462, Restriction Requirement mailed Jun. 2, 2009, 6 pages.
U.S. Appl. No. 12/272,462, Response to Restriction Requirement filed Jul. 2, 2009, 12 pages.
U.S. Appl. No. 11/485,080, Notice of Allowance dated Jul. 9, 2009, 4 pages.
Canadian Patent Application No. 2,351,257, Office Action dated May 1, 2009, 4 pages.
PCT/US05/25478, International Search Report & Written Opinion, mailed Feb. 15, 2006, 4 pages.
PCT/US05/25478, International Preliminary Report on Patentability, Jan. 23, 2007, 4 pages.
Makarov, A.M. & Sorokin, S.S., Heat Exchange of a Bubble Coated With a Liquid Film on the Rear Surface, Chemical and Petroleum Engineering, vol. 30, No. 2, 1994, pp. 78-81.
U.S. Appl. No. 12/254,359 Notice of Allowance mailed Apr. 1, 2009.
U.S. Appl. No. 12/177,467 Response to Restriction Requirement filed Mar. 30, 2009.
U.S. Appl. No. 11/849,413 Notice of Allowance mailed Mar. 10, 2009, 4 pages.
U.S. Appl. No. 11/485,223 Response to Office Action filed Mar. 11, 2009, 13 pages.
U.S. Appl. No. 11/485,223 Office Action mailed Nov. 12, 2008, 9 pages.
U.S. Appl. No. 11/485,080 Office Action mailed Jan. 9, 2009, 8 pages.
U.S. Appl. No. 11/485,080 Response to Office Action filed May 8, 2009, 4 pages.
U.S. Appl. No. 11/272,446 Notice of Allowance and Examiner Interview Summary mailed Mar. 27, 2009, 11 pages.
U.S. Appl. No. 11/145,871 Office Action mailed Mar. 18, 2009, 16 pages.
U.S. Appl. No. 10/895,015 Notice of Allowance mailed Feb. 9, 2009, 4 pages.
Substantive examination report Application No. 01305133.9.
Further substantive examination report Application No. 01305133.9.
Canadian Application No. 2,441,259 Office Action dated Oct. 14, 2009, 7 pages.

\* cited by examiner

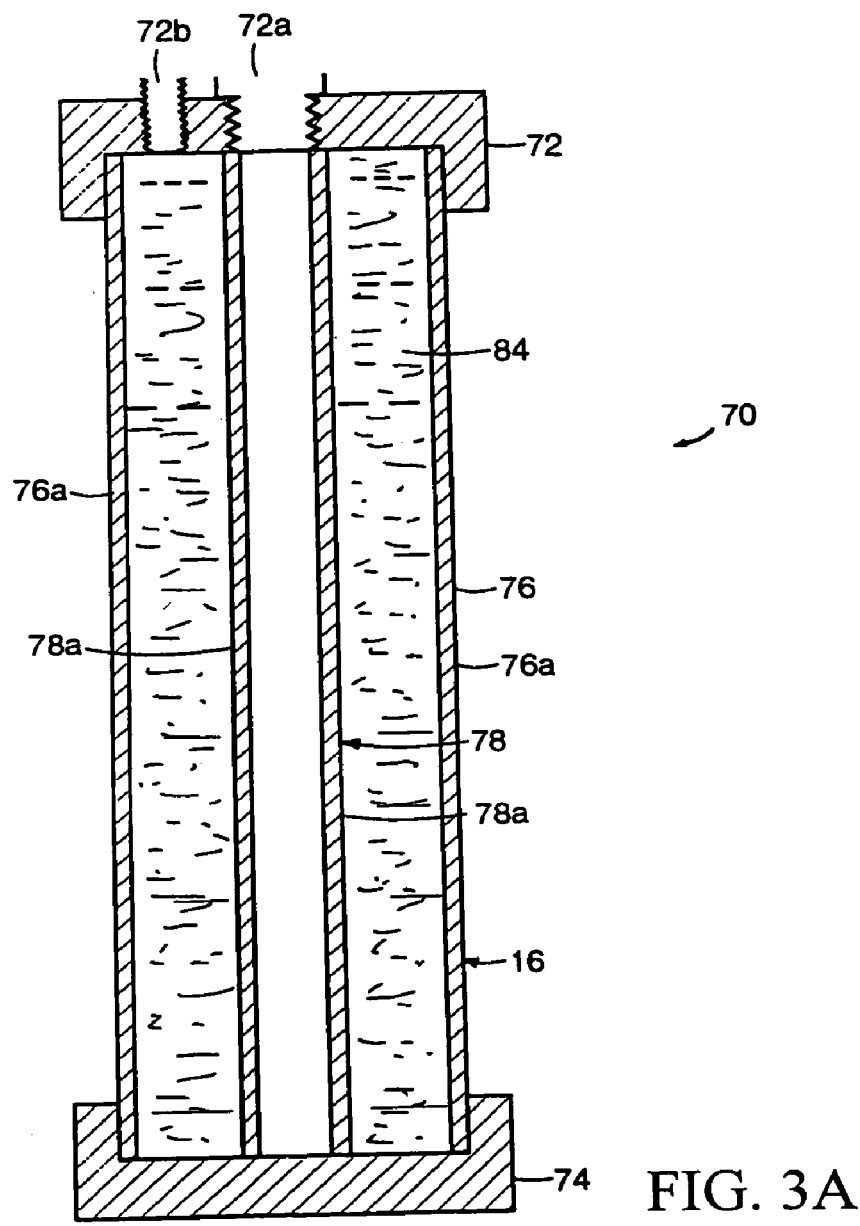
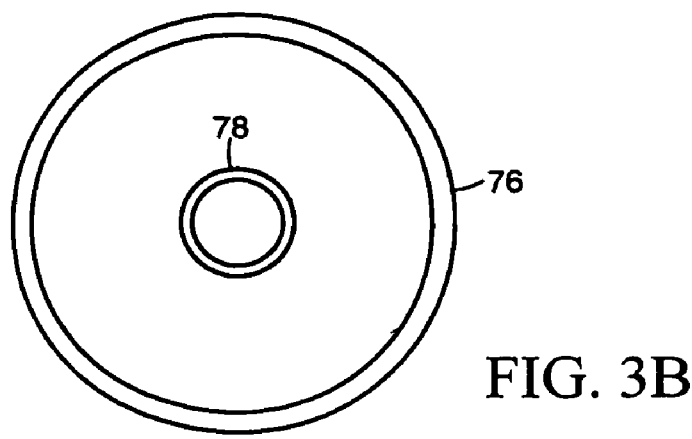
FIG. 3A
FIG. 3B

US 7,666,313 B2

GROUNDWATER AND SUBSURFACE REMEDIATION

This application is a continuation of application Ser. No. 10/602,256, filed on Jun. 23, 2003, (now U.S. Pat. No. 7,033,492), which was a divisional application of application Ser. No. 09/610,830, filed on Jul. 6, 2000, (now U.S. Pat. No. 6,582,611).

BACKGROUND

This invention relates generally to groundwater and subsurface soil remediation.

There is a well recognized need for removal of subsurface contaminants that exist in aquifers and surrounding soils. Such contaminants can include various man-made volatile hydrocarbons including chlorinated hydrocarbons, e.g., volatile organic compounds such as chlorinated olefins including tetrachloroethylene, trichloroethylene, cis 1,2-dichloroethane and vinyl chloride. Other compounds include aromatic or polyaromatic ring compounds such as benzene, toluene, methylbenzene, xylenes, naphthalene, and propellents or explosives such as nitro anilines trinitrotoluene, and so forth. The groups of compounds are characterized by aromatic ring structures also include alkyl substituted aromatic hydrocarbons.

SUMMARY

According to an aspect of the present invention, a method of treating a site includes sparging the site with an air/ozone gas stream delivered with a hydroperoxide, which is a substantial byproduct of a reaction of a contaminant present in the aquifer or soil formation with the ozone.

The air/ozone gas stream is delivered through a microporous diffuser that delivers the air/ozone gas in microbubbles. In some embodiments, the hydroperoxide is selected from the group consisting of formic peracid, hydroxymethyl hydroperoxide, 1-hydroxylethyl hydroperoxide, and chloroformic peracid or their derivatives. The hydroperoxide is selected based on the type of contaminant present in the site. The hydroperoxide is delivered as a surface layer over microfine bubbles including the air/ozone gas. Sparging introduces air including the oxidizing gas into the microporous diffuser. The microporous diffuser also introduces promoters or nutrients such as catalyst agents including iron containing compounds such as iron silicates or palladium containing compounds such as palladized carbon and platinum or platinum containing compounds.

According to an additional aspect of the invention, an apparatus for treating subsurface water includes a well having a casing with an inlet screen and outlet screen to promote recirculation of water into the casing and through surrounding ground area and at least one microporous diffuser disposed in the injection well that allows delivery of a pair of fluids with one of the fluids forming a coating over the other of the fluids. The apparatus also includes an ozone generator, an air compressor and compressor/pump control mechanism to deliver ozone ($O_3$) from the ozone generator to the microporous diffuser, and a source of the liquid hydroperoxides selected from the group consisting of formic peracid, hydroxymethyl hydroperoxide, 1-hydroxylethyl hydroperoxide, and chloroformic peracid or their derivatives. The apparatus includes a pump to deliver the selected liquid hydroperoxide to the microporous diffuser.

One or more of the following advantages may be provided by one or more aspects of the invention.

The hydroperoxides promote decomposition of chlorinate olefins by forming a secondary liquid-phase reactive interface to the contaminants such as volatile chlorinate olefins and volatile hydrocarbons including chlorinated hydrocarbons, chlorinated olefins such as tetrachloroethylene, trichloroethylene, cis 1,2-dichloroethane and vinyl chloride and other compounds e.g., aromatic ring compounds, propellants, explosives, and so forth that are found as contaminants compounds as the contaminants enter the gaseous phase within the bubbles.

Promoters or nutrients are introduced with the hydroperoxides. The hydroperoxides are produced by reactions that decompose the contaminants. In the presence of the hydroperoxides, the promoters or nutrients can combine with the hydroperoxides and promote and accelerate the decomposition reactions. Further, when treating contaminants that have large number of double bonded carbon atoms or which are present in super-saturated conditions the addition of the hydroperoxides promotes rapid and efficient Crieqee reactions of the contaminants.

BRIEF DESCRIPTION OF THE DRAWINGS

FIGS. 2A-3A and 2B-3B are respectively longitudinal cross-sectional and plan cross-sectional views of a microporous diffuser useful in the arrangement of FIG. 1.

DETAILED DESCRIPTION

Figure 1A:
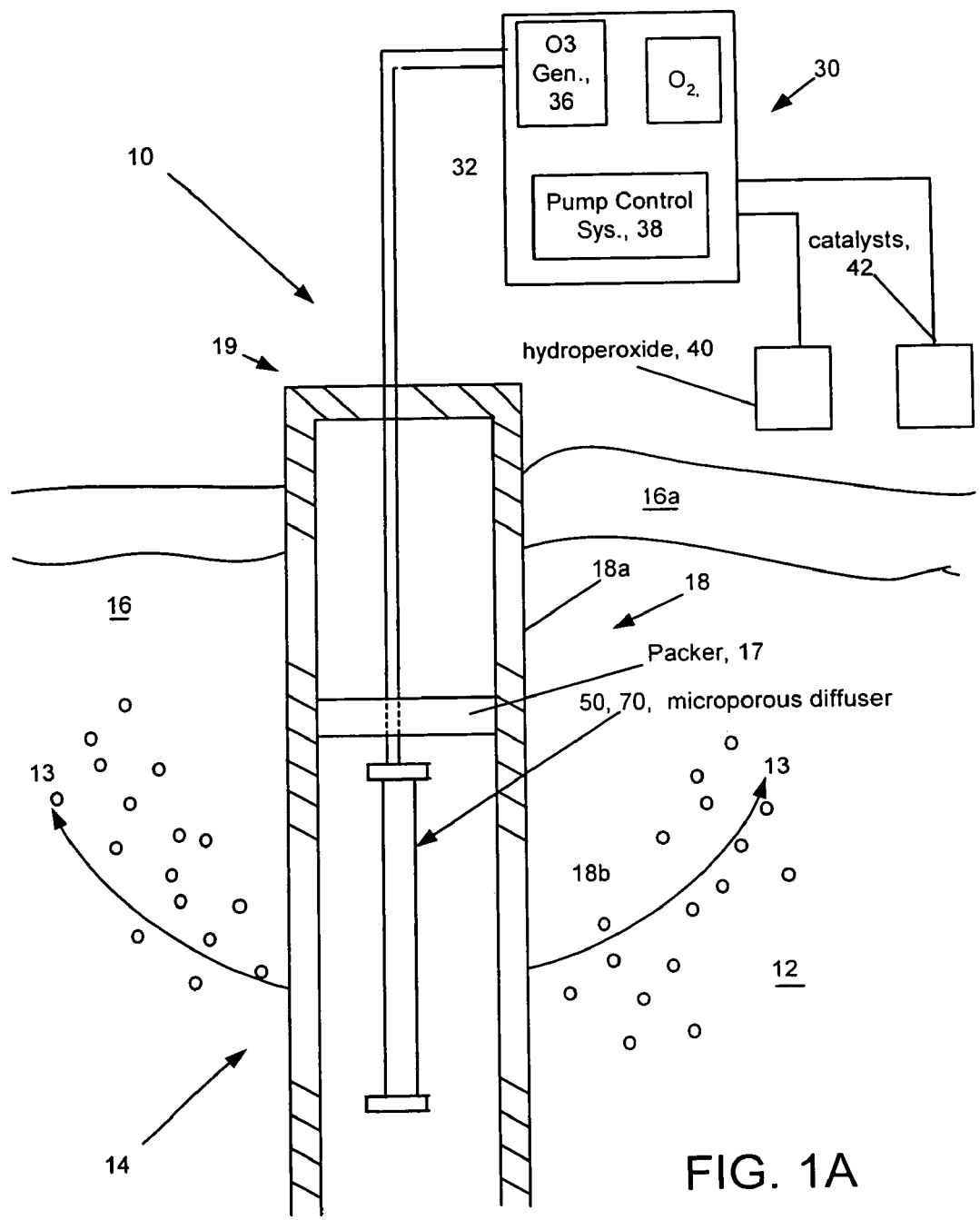
FIGS. 1A-1B are cross-sectional views showing soil formations and underlying aquifers with two embodiments of sparging apparatus.

Referring to FIG. 1A, an arrangement of a treatment system 10 to treat contaminants in a subsurface aquifer 12 includes an sparging apparatus 14 that is disposed through a soil formation 16. In this arrangement, the sparging apparatus is disposed through a vadose zone 16a and the underlying aquifer 12. The sparging apparatus 14 includes a casing 18 that is positioned through a bore hole 19 disposed through the soil formation 16. The casing 18 has an inlet screen 18a disposed on an upper portion thereof and an outlet screen 18b disposed on a bottom portion thereof. Disposed through the casing 18 is a microporous diffuser 50 (FIG. 2A, 2B) or 70 (FIG. 3A, 3B), as will be described below. Also disposed in the casing is a packer 17 that isolates the upper screen 18a from the lower screen 18b and appropriate piping to connect sources of decontamination agents to the microporous diffuser 50, 70. When fluid is injected through the microporous diffuser 50, 70 the packer 17 and screens 18a, 18b enable a re-circulation water pattern 13 to evolved about the sparging apparatus 14.

The arrangement 10 also includes a treatment control system 30 including an air compressor 32, e.g., pump that feeds a mixture of air/ozone into the microporous diffusers 50, 70. The air compressor 32 delivers air mixed with ozone ($O_3$) that is produced from an ozone generator 36 into the microporous diffusers. The mixture of air/ozone affects substantial removal of contaminants such as various man-made volatile hydrocarbons including chlorinated hydrocarbons, chlorinated olefins such as tetrachloroethylene, trichloroethylene, cis 1,2-dichloroethane and vinyl chloride and other compounds e.g., aromatic ring compounds, propellants, explosives, and so forth that are found as contaminants.

The treatment system 10 also includes a delivery mechanism e.g., a second pump 38 or other feed arrangement that supplies a liquid decontamination agent such as hydrogen peroxide or other hydroperoxides into the microporous diffuser 50, 70. The hydrogen peroxide or other hydroperoxides are provided via a source 40. Also supplied to the microporous diffusers are promoters or nutrients, as well as catalyst agents 42 including iron containing compounds such as iron silicates, ferrous iron, acetic acid, or palladium containing compounds such as palladized carbon or other transition metals in acid solution. In addition, other materials such as platinum may alternatively be used. The promoters or nutrients are introduced with the hydroperoxides. The hydroperoxides are produced by reactions that decompose the contaminants. In the presence of the hydroperoxides, the promoters or nutrients can combine with the hydroperoxides and promote and accelerate the decomposition reactions.

Figure 1B:
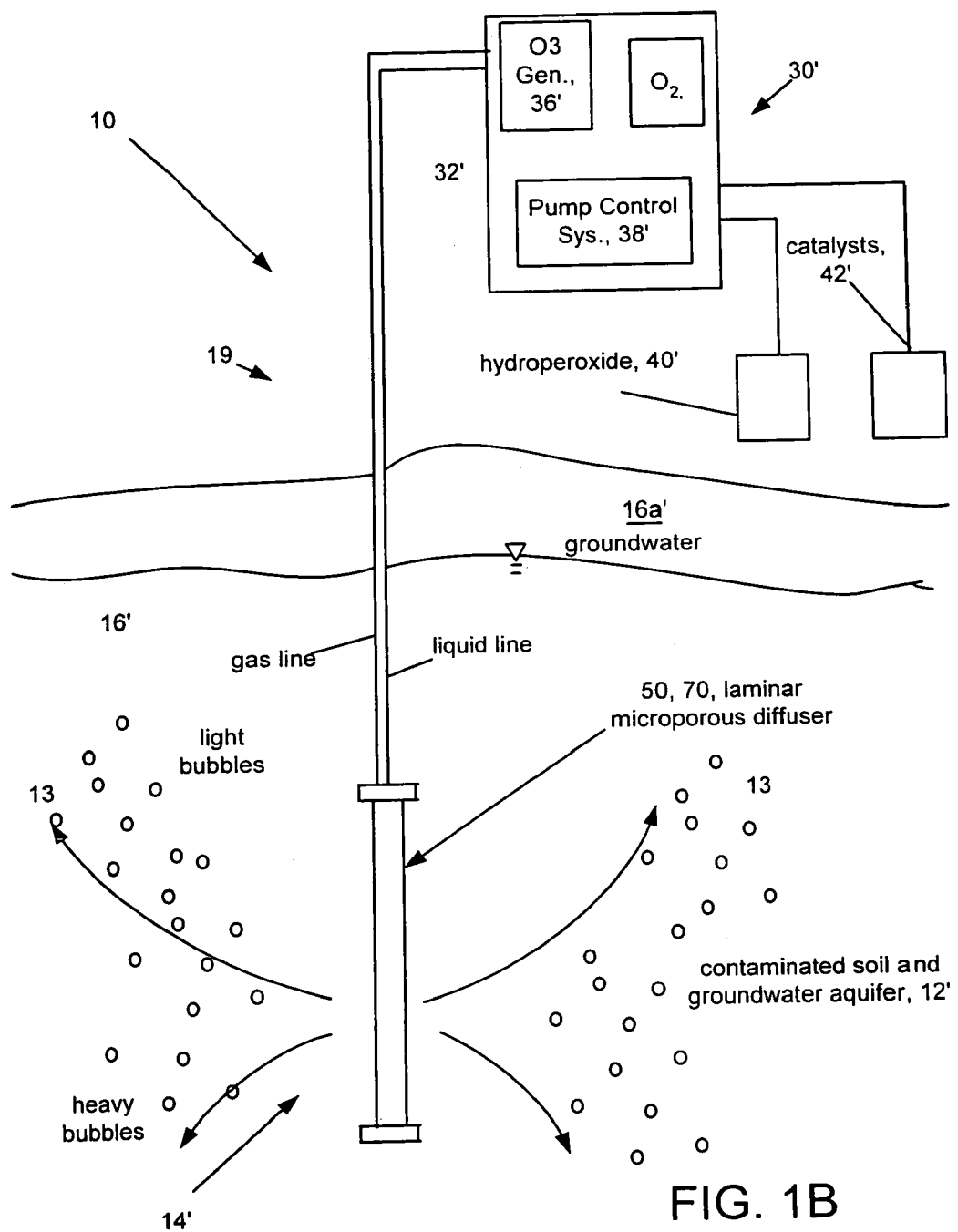

Referring to FIG. 1B an alternate embodiment of a treatment system 10' is shown. The treatment system 10' treats contaminants in a subsurface aquifer 12' includes an sparging apparatus 14' that is disposed through a soil formation 16'. In this arrangement, the sparging apparatus is disposed through a vadose zone 16a' and the underlying aquifer 12'. The sparging apparatus 14 includes a microporous diffuser 50 (FIG. 2A, 2B) or 70 (FIG. 3A, 3B), as will be described below. The microporous diffuser is positioned through a bore hole 19 disposed through the soil formation 16 or alternatively can be of the type that is injected into the soil formation. The microporous diffuser is coupled to appropriate piping to connect sources of decontamination agents to the microporous diffuser 50, 70. When fluid is injected through the microporous diffuser 50, 70, the microporous diffusers enables a water pattern 13' to evolved about diffuser. Light bubbles tend to travel upwards whereas heavier bubbles tend to travel downwards.

The arrangement 10' also includes a treatment control system 30' generally similar to system 30' (FIG. 1A) including an air compressor 32' that feeds a mixture of air/ozone into the microporous diffusers 50, 70. The air compressor 32' delivers air mixed with ozone ($O_3$) that is produced from an ozone generator 36 into the microporous diffusers. The treatment system 10' also includes a second pump 38' that supplies a liquid decontamination agent such as hydrogen peroxide or other hydroperoxides into the microporous diffuser 50, 70. The hydrogen peroxide or other hydroperoxides are provided via a source 40'. Also supplied to the microporous diffusers are promoters or nutrients, as well as catalyst agents 42' as also mentioned above.

The treatment system 10 or system 10' makes use of a gas-gas reaction of contaminant vapors with ozone, as will be described below, supplemented by a liquid phase reaction provided by a flow of hydrogen peroxide and preferable other hydroperoxides, described below. The ozone is trapped inside of micro bubbles produced from the air/ozone escaping the microporous diffusers 50, 70 and being trapped in water from the aquifer. On the other hand, hydrogen peroxide or other hydroperoxides provide a thin film coating over the outer surfaces of the bubbles.

The hydroperoxides promote decomposition of chlorinate olefins by forming a secondary liquid-phase reactive interface to the contaminants such as volatile chlorinate olefins and volatile hydrocarbons including chlorinated hydrocarbons, chlorinated olefins such as tetrachloroethylene, trichloroethylene, cis 1,2-dichloroethane and vinyl chloride and other compounds e.g., aromatic ring compounds, propellants, explosives, and so forth that are found as contaminants compounds as the contaminants enter the gaseous phase within the bubbles. Suitable hydroperoxides can be as these listed in Table 1.

TABLE 1

| Structure | Name | Allen's Reagent Rate Reaction Constant |
|---|---|---|
| HCOOOH | Formic Peracid | 218 |
| $H_2O_2$ | Hydrogen peroxide | 0.27 |
| $HOCH_2OOH$ | Hydroxymethyl Hydroperoxide | $3.4 \times 10^{-3}$ |
| $CH_3CH(OH)OOH$ | 1-Hydroxylethyl Hydroperoxide | $5 \times 10^{-2}$ |
| $(CH_3)_2C(OH)OOH$ | Chloroformic Peracid | $\sim 2 \times 10^{-5}$ |

These hydroperoxides or derivatives thereof react at different rates with the olefins, as shown for the Allen's Reaction Rate Constants in Table 1. The presence of the hydroperoxides as a coating over the gas bubbles contact contaminants such as compounds containing aromatic rings to break the rings into fragments that partition from liquid to gas phase bringing them more rapidly into contact with the gaseous ozone within the microfine bubbles. The presence of iron of a transition metal e.g., nickel or tin, or platinum or palladium solution can assist the reaction by becoming electron donors or act as catalyst agents.

In general, the hydroperoxides are intermediary compounds that are produced from a reaction of ozone with particular olefins. Thus, for other olefins the appropriate hydroperoxide would be the intermediary hydroperoxide that results from the reaction of the olefin with ozone.

While ozone in high concentration is recognized as an agent for rapid decomposition of semi-volatile or poorly volatile polyaromatic ring compounds in soil, the combination of a slowly reacting hydroperoxides and ozone provides improved efficiency of delivery and reaction. This results since the gaseous partitioning pulls compounds through the hydroperoxide interface reducing extraneous secondary reactions that occur with soil components as observed when hydrogen peroxide is injected as a solution into fractured soil formations, as in so called Fenton's agent reactions.

As mentioned above, these hydroperoxides formic peracid, hydrogen peroxide, hydroxymethyl hydroperoxide, 1-hydroxymethyl hydroperoxide, and chloroformic peracid, are intermediary products in reactions involving chlorinated olefins and ozone. As by-products of reactions of the chlorinated olefins with ozone the presence of the hydroperoxides as a coating on the bubbles serves to mitigate other competing reactions that can occur when the chlorinated olefins double bonded carbon atoms are attacked by the ozone as the chlorinated olefins enter the bubbles.

The coating on the bubbles provided by the microporous diffusers 50, 70 can be consider to be a gas-liquid-emulsion since the micro bubbles are dispersed gases with film coatings. Rather than a foam, the material co-exists in liquid water and does not necessarily rise to the top surface. Moreover, the hydroperoxide coating is not technically in solution with the gas. A solution would have the ozone gas and hydroperoxide liquid dispersed homogeneously without chemical change. In this arrangement, the coating on the bubbles exist separate from the gas inside the bubbles.

Figure 2A:
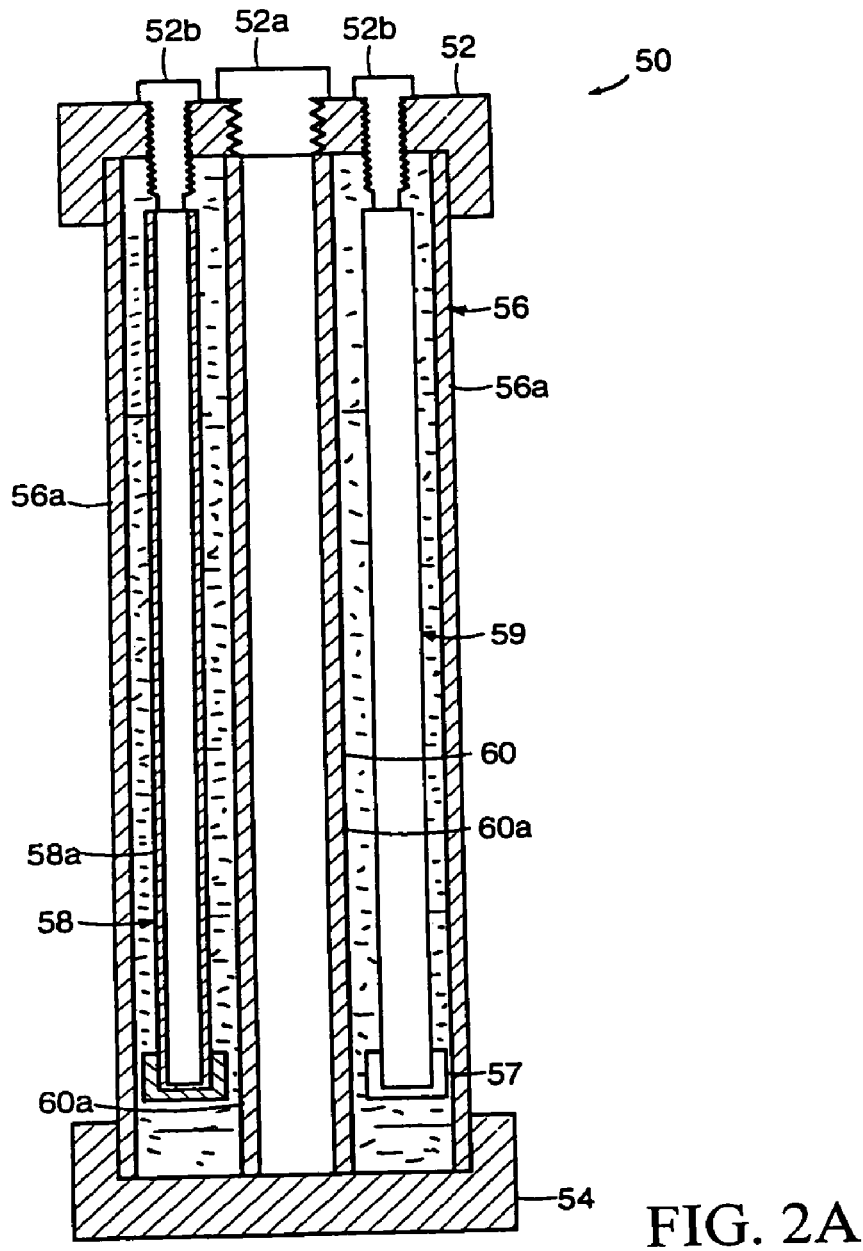
Figure 2B:
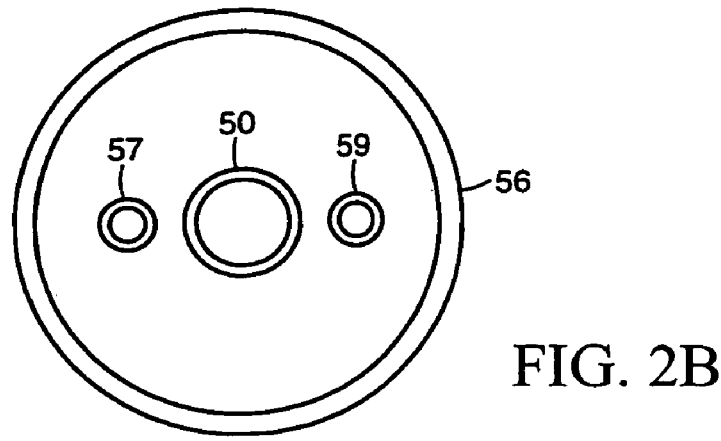
Figure 4:
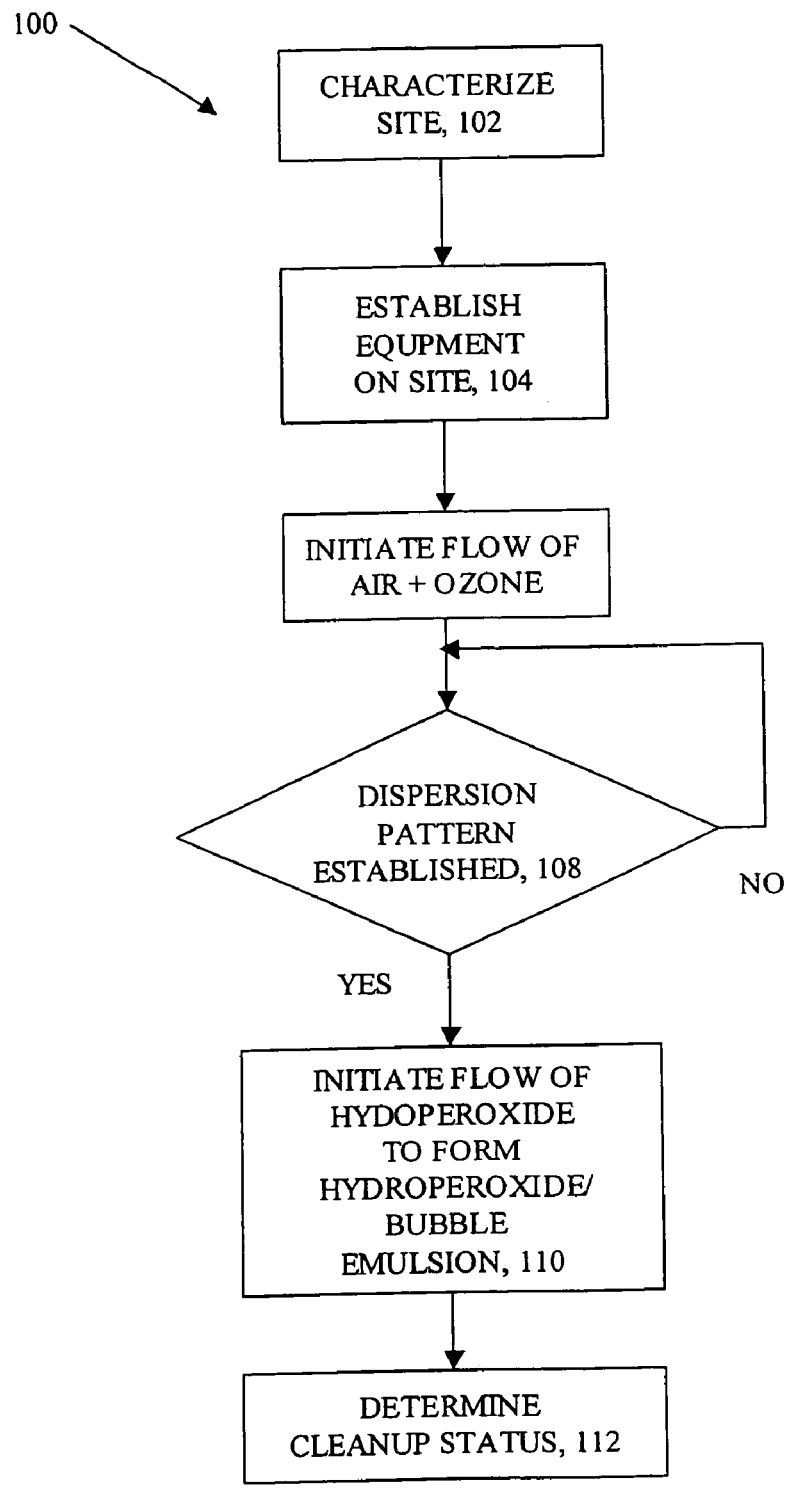
FIG. 4 is a flow chart of a process flow using the system of FIG. 1A or FIG. 1B.

Referring now to FIGS. 2A-2B, a first embodiment of a microporous diffuser 50 is shown. The microporous diffuser 50 includes a first cylindrical member 56 comprised of a hydrophobic material that provides an outer cylindrical shell for the microporous diffuser 50. The cylindrical member 56 has a sidewall 56a that is comprised of a large plurality of micropores. A second cylindrical member 60 is coaxially disposed within the first cylindrical member 56. The second cylindrical member 60 is comprised of a hydrophobic material e.g., high density polyethylene or polyvinyl chloride etc. and has a sidewall 60a that is comprised of a large plurality of micropores. Also disposed within the confines of the first microcylinder 60 are a plurality of cylindrical members 58, here that have sidewalls 58a having a large plurality of micropores and also comprised of a hydrophobic material.

A proximate end of cylindrical member 60 is coupled to a first inlet port provided from a first inlet cap 52 and proximate ends of the plurality of cylindrical members 58 are coupled to second inlet ports generally denoted as 52b. At the opposite end of the microporous diffuser 50 is an end cap 54 that covers distal ends of cylindrical members 56 and 58. Here distal ends of the plurality of cylindrical members are sealed by separate caps 59 but could be terminated by a common end cap as the end cap 54. The end cap 54, in conjunction with cap 52, seals ends of the microporous diffuser 50.

The cylindrical members 56, 58 and 60 are cylindrical in shape and have a plurality of microporous openings constructed through sidewalls 56a, 58a and 60a, respectively thereof, having pore sizes matched to a porosity characteristic of the surrounding formation to produce a pore size effective for inducing gas-gas reactions in bubbles that emanate from the microporous diffusers into the surrounding soil formations and/or aquifer. The sidewalls can have pore diameters in a range of 1-200 microns, preferably 1 to 50 microns or more preferably 5 to 20 microns.

The combination of the inlet cap and the end cap seals the microporous diffuser 50 permitting liquid and gas to escape by the porous construction of sidewalls of the microporous diffusers. The microporous diffuser can be filled with a microporous material such as microbeads having mesh sizes from 20 to 200 mesh, or sand pack, or porous hydrophilic plastic to allow introducing a liquid into the porous spaces. In this arrangement, the liquid is one of the aforementioned hydroperoxides formic peracid, hydrogen peroxide, hydroxymethyl hydroperoxide, 1-hydroxymethyl hydroperoxide, and chloroformic peracid or derivatives, and so forth.

Referring now to FIGS. 3A and 3B, an alternative embodiment 70 of the microporous diffuser is shown. The microporous diffuser 70 includes an outer cylindrical member 76 having a sidewall 76a within which is disposed an inner cylindrical member 78 having a sidewall 78a. The inner cylindrical member 78 is spaced from the sidewall of the outer cylindrical member by a space 77. The space 77 between the inner and outer cylindrical members 76, 78 is filled with a packing material comprised of glass beads or silica particles (silicon dioxide) or porous plastic which is, in general, hydrophilic in nature. The space is coupled to an input port 72 that receives a liquid and catalyst and/or promoters or nutrients from pump 39 (FIG. 2). The microporous diffuser has the inner cylindrical member 78 disposed coaxial or concentric to cylindrical member 78.

Sidewalls of each of the cylindrical members can have a pore diameter in the range of 1 to 200 microns. Depending on soil conditions various ranges can be used exemplary ranges are 50 to 200 microns for very coarse gravel-like soils, 1 to 50 microns for sandy-type soils or 1-5 to 20 microns for more silty type soils. A proximate end of the cylindrical member is coupled to an inlet port 72a that is fed an air-ozone mixture from pump 36. The microporous diffuser also includes an end cap 74 which secures distal ends of a cylinder 76, 78. The combination of the inlet cap 72 and end cap 78 seals the microporous diffuser permitting liquid and gas to escape by the porous combination of construction of the sidewalls of the microporous diffusers. Also in this arrangement, the liquid is one of the aforementioned hydroperoxides, e.g., formic peracid, hydrogen peroxide, hydroxymethyl hydroperoxide, 1-hydroxymethyl hydroperoxide, and chloroformic peracid, etc.

Thus, when using the microporous diffusers 50 or 70 in the arrangement of FIG. 1, an air-ozone mixture is injected through port 52a, 72a (microporous diffusers 50, 70, respectively) and produces bubbles of the diameters according to the pore size of the sidewalls of the cylinder. Liquid hydroperoxides e.g., formic peracid, hydrogen peroxide, hydroxymethyl hydroperoxide, 1-hydroxymethyl hydroperoxide, and chloroformic peracid etc., as set forth in Table 1 is introduced into the microporous diffusers 50 and 70 via inlet ports 52b and microporous diffuser 50 or inlet port 72b and microporous diffuser 70. The presence of liquid in the microporous diffusers will coat microbubbles that emerge from the central portions of the microporous diffusers providing the liquid-gas emulsion referred to above. This liquid-gas emulsion exits the microporous diffusers 50, 70 and travels through the surrounding soil formation and aquifer.

The Criegee reaction of ozone in a water gas mixture is promoted by the microbubble emulsion. The hydroperoxide compounds and ozone produce reactions during the process of water to gas partitioning with volatile organic compounds or absorbed liquid/water to gas partitioning with semi-volatile organic compounds. The breakdown of chlorinated or halogenated solvents in an aqueous solution by Criege decomposition involving ozone yields various hydroperoxide products such as those set forth in Table 1. To promote higher concentration of volatile organic and semi-volatile organic destruction, the organic hydroperoxides are injected with the laminated microporous diffusers 50, 70 as a coating for the microporous emulsions. The injection which occurs under pressure produces an aerosol in the system 10 where water is reduced to particles of micron size. Therefore to practice the methods described below, any system that can produce an aerosol of the hydroperoxide coated bubbles may be used.

The peroxide acid solution becomes a coating of a micro-size bubble occupying a fifth or less of the volume of the gas injected. It is believed that at this point, the coating is not in solution with the water or ozone. As used a solution can be considered as a gas, liquid or solid dispersed homogeneously in a gas, liquid or solid without chemical change. Rather, the hydroperoxide/water/ozone is a gas-liquid emulsion as referred to above. Attaching to the surface of a semi-volatile compound such as an olefin e.g., nitroaniline or nitrotoluene or polyaromatic ring compounds the coating reacts with the aromatic rings of such compounds to break the rings into fragments that partition from a liquid to gas phase bringing them even more rapidly into contact with the gaseous ozone content.

Referring to FIG. 4, a process 100 using the arrangement 10 of FIG. 1 for treating groundwater and surface waters includes characterizing 102 a site. Characterizing the site includes determining the porosity characteristics of surrounding soil formations, depth to aquifers, thickness of aquifers, the hydraulic conductivity of the aquifer, and the nature and extent of contaminants, e.g., types and concentrations in aqueous solution and in the soils. After the site has been characterized, equipment of the arrangement shown in FIG. 1 or an equivalent arrangement are established 104 on the site. The equipment established 104 can be comprised of a large plurality of apparatuses of the type shown in FIG. 1 disposed in a corresponding plurality of wells provided on the site in accordance with the volume of subsurface soils and water that the apparatus can treat. Many different configurations of the equipment can be used such as placing multiple microporous diffusers 50, 70 into a single well or using one or more of the microporous diffusers in combination with microporous well screens and packers to produce a bubble chamber and so forth. Typically, an apparatus having single laminar point and double well screens can cover a radii of 30 ft. and 60 ft., respectively for 15-20 ft. thick aquifers.

Once the equipment has been established on a site, the process 100 initiates 106 a flow of air and ozone (O3) through the microporous diffusers 50, 70. In response, the process 100 produces microbubbles of appropriate size determine in accordance with the porosity characteristics of the microporous diffusers that attempt to match that of the surrounding soil formation. As described above, generally this porosity characteristic is in a range of 5 to 200 microns. Other ranges may be used however. The flow of air and ozone continues through the microporous diffusers 50, 70 and produces a dispersed pattern of microfine bubbles through the treatment area. During the process 100, the wells are monitored 108 to determine when a microfine bubble pattern of appropriate dispersion through the treatment zone has been established. Bubble dispersion can be determined by dissolved oxygen distribution, oxidative reduction potential measurements, or by direct measurement of micro-bubbles (bubble counters). Once this pattern has been established the process initiates 110 a flow of a suitable hydroperoxide(s) selected in accordance with the contaminant(s) being treated. The hydroperoxides are in the form of liquid that is provided in the outer portions of the microporous diffusers 50, 70. Initiation 110 of the flow of hydroperoxides allows the hydroperoxides to coat the microbubbles as they emerge from the center of the microporous diffusers 50, 70 producing the abovementioned hydroperoxide bubble emulsion. The process periodically samples 112 groundwater to determine the cleanup status of the site. Once contaminants in the groundwater have reached a certain level, the process 100 can be terminated. Alternatively, the process can be used as a fence to continually and indefinitely pump air-ozone and a suitable hydroperoxide into a portion of a contaminated site to contain a migrating plume of contaminants from reaching a critical area such as residential wells, aquifers and so forth.

Typical conditions for the air/ozone flow are as follows:

| Unit | Air | Ozone gm/day | hydro-peroxide gal/day | recirculation wells | laminar microporous diffuser |
|---|---|---|---|---|---|
| wall mount | 3-5 CFM | 144-430 | 5-50 | 1-4 | 1-8 |
| pallettized | 10-20 CFM | 300-1000 | 20-200 | 1-8 | 1-16 |

The percent concentration of hydroperoxide in water is typically in a range of (2-20) percent although other concentrations can be used. The flow is adjusted to the total mass of the contaminants in the soil and water. If high concentrations (greater than 50,000 parts per billion in water or 500 mg/kg in soil) of the contaminants are present sufficient hydroperoxides should be added in insure efficient decomposition by the Criegee reaction mechanism. Preferably this would occur in the presence of an accelerant (e.g., transition metals iron, nickel or zinc, and/or catalysts palladium or platinum).

Further, when treating contaminants that have large number of double bonded carbon atoms or which are present in super-saturated concentrations e.g., (greater than 200,000 parts per billion in water or 5000 mg/kg in soil) the addition of the hydroperoxides is highly desirable to promote rapid and efficient Criegee reactions on the site. This is because, the mole volume or ratio of moles of the contaminant to moles of ozone becomes high in the presence large number of double bonded carbon atoms or high concentrations, while the concentration of the ozone is limited to that which can be suitable injected taking into consideration generation capacity, stress on the apparatus, site conditions and desire to maintain a Criegee mechanism.

Other embodiments are within the scope of the appended claims.

What is claimed is:

1. A method of treating a site comprises:
   identifying a contaminant within the site to be removed,
   determining an intermediary hydroperoxide that results from a reaction between the contaminant and ozone,
   sparging the site with a gas stream comprising air and ozone, and
   introducing the intermediary hydroperoxide from an externally-supplied source to the site.

2. The method of claim 1 wherein the gas stream comprising air and ozone is delivered through a microporous diffuser that delivers the gas comprising air and ozone in microbubbles.

3. The method of claim 1 wherein the hydroperoxide is selected from the group consisting of formic peracid, hydroxymethyl hydroperoxide, 1-hydroxylethyl hydroperoxide, and chloroformic peracid or their derivatives.

4. The method of claim 1 wherein the hydroperoxide is selected based on the type of contaminant present in the site.

5. The method of claim 1 wherein the hydroperoxide is delivered through a microporous diffuser.

6. The method of claim 5 wherein the microporous diffuser includes promoters or nutrients such as catalyst agents including iron containing compounds such as iron silicates or palladium containing compounds such as palladized carbon and platinum.

7. The method of claim 6 wherein the microporous diffuser has a pore size in the range of about 1 to 200 microns.

8. The method of claim 1 wherein sparging comprises:
   introducing the gas stream comprising air and ozone into a microporous diffuser.

9. The method of claim 8 wherein the sparging comprises: introducing hydroperoxide as a liquid into the microporous diffuser.

10. The method of claim 9 wherein the microporous diffuser has a pore size in a range of about 1 to 200 microns.

11. The method of claim 1 wherein the hydroperoxides are byproducts of a reaction involving a volatile organic compound with ozone.

12. The method of claim 1 wherein the sparging comprises:
   introducing hydroperoxide as a liquid into a microporous diffuser.

13. A method of treating a site comprises:
   identifying a contaminant within the site to be removed,
   determining an intermediary hydroperoxide that results from a reaction between the contaminant and ozone,
   selecting the intermediary hydroperoxide from an externally-supplied source, and
   sparging the site with microbubbles of air/ozone gas, the microbubbles having a coating of the selected intermediary hydroperoxide by:
   injecting through at least one diffuser a first fluid of the selected intermediary hydroperoxide as the coating over the microbubbles of ozone and air.

14. The method of claim 13 wherein the air/ozone gas stream is delivered through a microporous diffuser that delivers the air/ozone gas in microbubbles.

15. The method of claim 13 wherein the hydroperoxide is selected from the group consisting of formic peracid, hydroxymethyl hydroperoxide, 1-hydroxylethyl hydroperoxide, and chloroformic peracid or their derivatives.

17. The method of claim 13 wherein sparging the site, comprises:

injecting through the at least one microporous diffuser the first fluid of a hydroperoxide selected from the group consisting of formic peracid, hydroxymethyl hydroperoxide, 1-hydroxylethyl hydroperoxide, and chloroformic peracid or their derivatives as the coating over the microbubbles of ozone and air.

\* \* \* \* \*

16. The method of claim 13 wherein the hydroperoxide is delivered as a surface layer over the microbubbles including air/ozone gas stream.

UNITED STATES PATENT AND TRADEMARK OFFICE
CERTIFICATE OF CORRECTION

PATENT NO. : 7,666,313 B2
APPLICATION NO. : 11/409892
DATED : February 23, 2010
INVENTOR(S) : William B. Kerfoot It is certified that error appears in the above-identified patent and that said Letters Patent is hereby corrected as shown below:

Abstract, line 2, "described The" should read --described. The--;
Column 1, line 25, "structures also" should read --structures and also--;
Column 2, line 8, "contaminants" should read --contaminant--; line 16, "that have" should read --that have a--; line 19, "Crieqee" should read --Criegee--; line 37, "an" should read --a--; line 52, "to evolved" should read --to evolve--;
Column 3, line 18, "12 'includes an" should read --12' and includes a--; line 31, "enables" should read --enable--; line 31, "evolved" should read --evolve--;
Column 4, line 32, "a slowly" should read --slowly--; line 50, "consider" should read --considered--;
Column 5, line 36, "hydroperoxides" should read --hydroperoxides,--; line 56, "used exemplary" should read --used. Exemplary--;
Column 6, line 9, "ides e.g." should read --ides, e.g.--; line 11, "peracid etc." should read --peracid, etc.--; line 26, "Criege" should read --Criegee--; line 45, "olefin e.g." should read --olefin, e.g.--; line 46, "compounds the" should read --compounds, the--;
Column 7, line 5, "respectively for" should read --respectively, for--; line 7, "O3" should read --$O_3$--; line 9, "determine" should read --determined--; line 56, "present sufficient" should read --present, sufficient--; line 62, "ber of" should read --bers of--; line 63, "e.g., (greater" should read --(e.g., greater--;
Column 8, line 1, "presence large number" should read --presence of large numbers--; line 3, "suitable" should read --suitably--.

Signed and Sealed this

Twenty-ninth Day of June, 2010

David J. Kappos
*Director of the United States Patent and Trademark Office*